Figure 1:
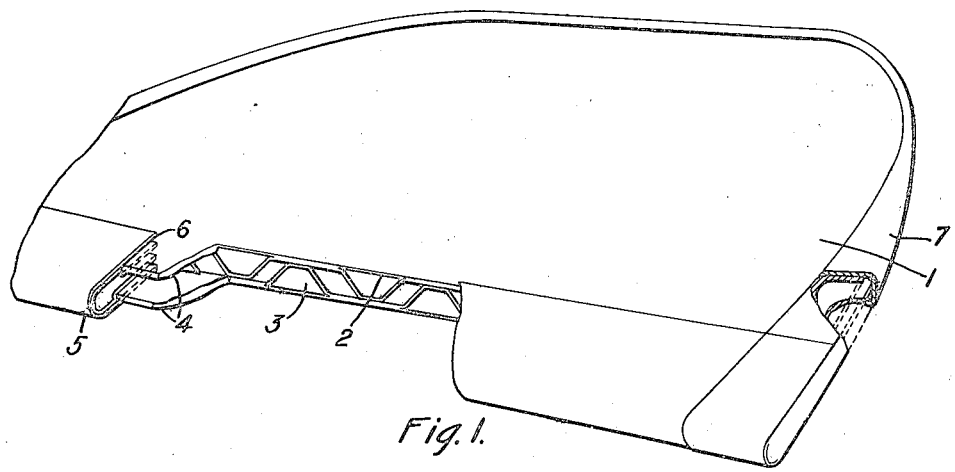

Oct. 2, 1923.  
R. KEMP  
1,469,220  
STRUCTURAL ELEMENT AND METHOD OF MAKING THE SAME  
Filed Jan. 25, 1919

WITNESSES:  
H. T. Shelhamer  
O. E. Bee.

INVENTOR  
Robert Kemp  
BY  
Wesley G. Carr  
ATTORNEY

Patented Oct. 2, 1923.

1,469,220

UNITED STATES PATENT OFFICE.

ROBERT KEMP, OF WASHINGTON, DISTRICT OF COLUMBIA, ASSIGNOR TO WESTING-HOUSE ELECTRIC & MANUFACTURING COMPANY, A CORPORATION OF PENNSYLVANIA.

STRUCTURAL ELEMENT AND METHOD OF MAKING THE SAME.

Application filed January 25, 1919. Serial No. 273,076.

*To all whom it may concern:*

Be it known that I, ROBERT KEMP, a citizen of the United States, and a resident of Washington, D. C., have invented a new and useful Improvement in Structural Elements and Methods of Making the Same, of which the following is a specification, this being a continuation in part of application, Serial No. 99,995, filed May 26, 1916.

My invention relates to structural elements and more particularly to such elements as are adapted for airplane construction. The primary object of my invention is to provide a method by which structural elements, comprising laminated bodies of fibrous material impregnated with a suitable binder, may be formed.

Heretofore, in airplane construction, the various structural elements employed were usually formed of either metal or wood. While such materials possess certain advantageous features, they are also objectionable, for various reasons, in airplane construction. For example, metal, when subjected to continuous vibrations or shocks, becomes crystallized and consequently materially weakened. Although wood is not particularly affected by vibrations and shocks, except where they are sufficient to splinter the wood, it is objectionable because of its tendency to warp, under climatic changes, and to become pitted, when subjected to air currents, so as to present an appearance of dry rot. In view of these facts, one object of my invention is to construct elements, which may be employed in airplane construction, by employing a material which is non-fatiguing, unaffected by moisture and which, though being light in weight, possesses exceptional mechanical strength.

Another object of my invention is the provision of structural elements which acquire a high finish during the natural course of their construction and, on account of this high finish, offer slight resistance to the passage of air currents.

With these and other objects in view, my invention will be more fully described, illustrated in the drawings, in the several views of which corresponding numerals indicate like parts, and then particularly pointed out in the claims.

Figure 2:
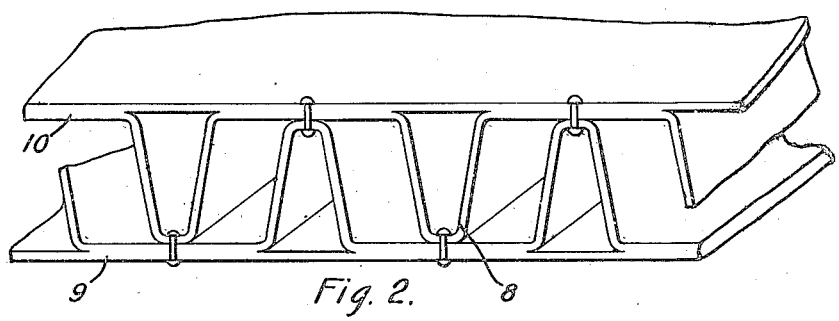
Figure 3:
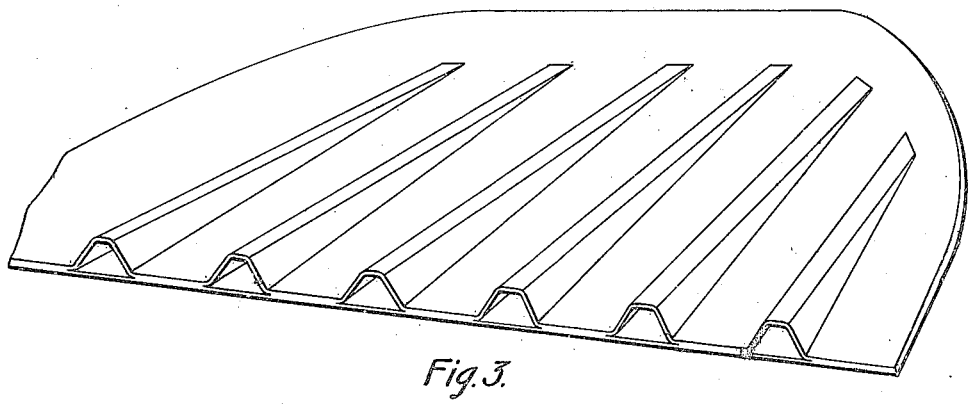

In the drawings, Fig. 1 is perspective view, parts being broken away, of an airplane rudder constructed in accordance with my invention; Fig. 2 is a perspective view, parts being broken away, illustrating the method of forming spacing ribs for certain structural elements of airplanes, and Fig. 3 is a perspective view of a portion of an airplane rudder embodying my invention.

In practising my invention, I may construct an airplane rudder, an elevating plane or the like by employing a suitable fibrous material and impregnating it with a suitable binder. The fibrous material, which is preferably employed in sheet form, may be superimposed in layers to form a composite sheet of the desired thickness, after which suitably shaped mandrels may be placed upon the stacked layers and additional layers of the impregnated material be superimposed upon the mandrels and the first stacked material between them, after which the assembled body may be subjected to heat and pressure in a mold to compact the material and to harden the binder. The mandrels may then be withdrawn from the cured body, leaving a composite plate having reinforcing ribs of similar material. A plurality of such plates, of desirable contour, may be suitably fastened together to provide an airplane rudder or elevating plane.

In Fig. 1 is shown an airplane rudder 1 comprising superimposed layers of fibrous material impregnated with a binder. The fibrous material is preferably in sheet form and may be muslin, duck, or paper, and the binder employed is preferably a phenolic condensation product. The rudder 1, here shown, may be formed by superimposing layers of the impregnated fibrous material to obtain a plate of suitable thickness, as indicated at 2, after which mandrels, conforming in shape to the openings 3 and tapered from end to end, may be disposed upon the stacked material 2 and additional material or layers may be superimposed upon the mandrels and the material between them. The body thus assembled, when subjected to heat and pressure in a mold, is compacted and united in a hard and unitary body by the hardening of the binder employed.

The superimposed layers of fibrous material may be cut to the desired outline of the finished product before being stacked and pressed or the compacted and hardened plate may be machined to shape, as desired. The mandrels are preferably disposed on the stacked sheet material so that straight portions of material 4 extend beyond them and provide suitable edges which may be employed in fastening a plurality of the formed plates together.

As shown in Fig. 1, a U-shape member 5 having split ends 6 may be employed to fasten the plates of one side of the rudder 1 together. The U-shape member may be formed of material similar to that comprising the composite plates forming the rudder 1. In case impregnated fibrous material is employed to form this member, it is preferably formed and hardened before being placed to fasten the ends of the rudder plates together. Another member 7, conforming to the contour of the rudder, may be employed to fasten together the remaining edges of the rudder plates not enclosed by the member 5. This member 7 may also be constructed of a fibrous material impregnated with a phenolic condensation product and heated and pressed in a mold. This member may be formed with straight edge portions and it may be secured to the plates composing the rudder by gluing, riveting or otherwise fastening the edges thereof to the edges of the plates.

Figs. 2 and 3 serve to illustrate more clearly the method of forming composite plates which may be employed in forming rudders or elevating planes. As shown in Fig. 2, the reinforcing or spacing ribs 8 may be formed without being tapered and two plates 9 and 10, having such reinforcing ribs, may be disposed upon each other and secured together by riveting the respective plates to the engaging ribs 8. Of course, in constructing these composite plates to be employed in forming rudders or elevating planes, care is taken to form the reinforcing or spacing ribs upon the several plates at such distances that, when a plurality of the plates are positioned, with the opposing reinforcing ribs engaging the respective surfaces of the plates, they will be substantially dovetailed. Tapered mandrels are employed in forming the reinforcing ribs in the rudder, above described, as it is desirable to have a finished rudder which tapers in approximately stream-line proportions.

Although I have specifically described a method of forming rudders and elevating planes only, it will be obvious that other structural elements may be formed by employing such method, and I desire, therefore, that no limitations shall be imposed except such as are indicated in the appended claims.

I claim as my invention:

1. An airplane rudder, elevating plane or the like comprising a body of superimposed layers of fibrous material impregnated with a hardened binder and integral reinforcing ribs of similar material.

2. An airplane rudder, elevating plane or the like comprising a body of superimposed layers of fibrous material impregnated with a hardened binder and reinforcing ribs of superimposed layers of fibrous material impregnated with a binder molded integrally therewith.

3. An airplane rudder, elevating plane or the like comprising a body of superimposed layers of fibrous material impregnated with a phenolic condensation product and reinforcing ribs of layers of fibrous material impregnated with a phenolic condensation product molded into a unitary body.

4. An airplane rudder, elevating plane or the like comprising a body of superimposed layers of fibrous material impregnated with a hardened binder, and tapered reinforcing ribs of similar material molded integrally therewith.

5. An airplane rudder, elevating plane or the like comprising spaced plates, hollow ribs formed on the opposed faces of the plates serving to space the plates, and means connecting the plates.

6. An airplane rudder, elevating plane or the like comprising spaced plates, hollow ribs on the opposed faces of the plates serving to space the plates and means connecting the plates, each plate and its ribs being integrally formed of fibrous material and a hardened binder.

7. An airplane rudder, elevating plane or the like comprising spaced plates, hollow ribs on the opposed faces of the plates serving to space the plates and means connecting the plates, each plate and its ribs being integrally formed of layers of fibrous sheet material and a hardened phenolic condensation product.

8. A method of making an airplane rudder, elevating plane or the like that comprises forming ribbed plates, by superimposing layers of sheet material impregnated with a binder, interposing rib-forming mandrels between certain of the layers and subjecting the assembled bodies to heat and pressure, and securing a plurality of such plates together, with the ribs formed by the interposed mandrels substantially dovetailed.

9. A method of making an airplane rudder, elevating plane or the like that comprises forming ribbed plates, by superimposing layers of sheet material impregnated with a phenolic condensation product, interposing tapered mandrels between certain of the layers and subjecting the assembled bodies to heat and pressure, and securing a plurality of such plates together, with the ribs formed by the interposed mandrels substantially dovetailed.

10. A structural element comprising a rudder formed of spaced converging plates provided with integral horizontally extending ribs, said plates being composed essentially of layers of fibrous material united by a binder, and means connecting the plates.

In testimony whereof, I have hereunto subscribed my name this 9th day of January, 1919.

ROBERT KEMP.